US008846225B2

(12) United States Patent
Sloop

(10) Patent No.: US 8,846,225 B2
(45) Date of Patent: Sep. 30, 2014

(54) REINTRODUCTION OF LITHIUM INTO RECYCLED BATTERY MATERIALS

(76) Inventor: Steven E. Sloop, Bend, OR (US)

(*) Notice: Subject to any disclaimer, the term of this patent is extended or adjusted under 35 U.S.C. 154(b) by 570 days.

(21) Appl. No.: 12/390,364

(22) Filed: Feb. 20, 2009

(65) Prior Publication Data
US 2009/0214933 A1 Aug. 27, 2009

Related U.S. Application Data

(60) Provisional application No. 61/030,916, filed on Feb. 22, 2008.

(51) Int. Cl.
*H01M 6/52* (2006.01)
*H01M 10/052* (2010.01)
*H01M 10/42* (2006.01)
*H01M 10/54* (2006.01)
*H01M 4/525* (2010.01)
*H01M 4/58* (2010.01)
*H01M 4/485* (2010.01)
*B02C 17/20* (2006.01)
*H01M 4/505* (2010.01)
*H01M 4/13* (2010.01)

(52) U.S. Cl.
CPC ............. *H01M 10/54* (2013.01); *H01M 4/525* (2013.01); *H01M 4/5825* (2013.01); *H01M 4/485* (2013.01); *H01M 10/052* (2013.01); Y02E 60/122 (2013.01); *B02C 17/20* (2013.01); *H01M 10/4242* (2013.01); *H01M 4/505* (2013.01); *H01M 4/13* (2013.01)
USPC ...................... 429/49; 117/2; 241/21; 423/63

(58) Field of Classification Search
CPC ... H01M 10/54; H01M 10/4242; Y02E 60/12
USPC ...................... 429/49; 117/2; 241/21; 423/62
See application file for complete search history.

(56) References Cited

U.S. PATENT DOCUMENTS

| | | | |
|---|---|---|---|
| 5,628,973 A | 5/1997 | Nishimura et al. | |
| 5,679,477 A | 10/1997 | Nishimura et al. | |
| 6,150,050 A | 11/2000 | Methew et al. | |
| 6,261,712 B1 | 7/2001 | Hayashi et al. | |
| 6,511,639 B1 | 1/2003 | Schmidt et al. | |
| 6,524,737 B1 | 2/2003 | Tanii et al. | |
| 6,652,644 B1 * | 11/2003 | Miller et al. ................ | 117/2 |
| 6,844,103 B2 | 1/2005 | Lee et al. | |
| 7,713,396 B2 | 5/2010 | Kakuta et al. | |
| 2003/0180604 A1 | 9/2003 | Zenger et al. | |
| 2004/0175618 A1 | 9/2004 | Inoue et al. | |
| 2005/0003276 A1 | 1/2005 | Sakai et al. | |
| 2005/0175877 A1 | 8/2005 | Hong | |
| 2005/0244704 A1 | 11/2005 | Sloop et al. | |
| 2007/0134546 A1 | 6/2007 | Hashimoto | |
| 2007/0224508 A1 | 9/2007 | Aramata et al. | |

FOREIGN PATENT DOCUMENTS

| | | |
|---|---|---|
| CN | 1585187 A | 2/2005 |
| EP | 1009058 A | 6/2000 |
| JP | 11054159 A | 2/1999 |

OTHER PUBLICATIONS

ISA US. International Search Report of PCT/US2009/034779. Apr. 16, 2009.
Gabrisch, H. et al., "Hexagonal to Cubic Spinel Transformation in Lithiated Cobalt Oxide", Journal of the Electrochemical Society, vol. 151, pp. A891-A897, May 4, 2004, 7 pages.
Antolini, E., "LiCoO2: formation, structure, lithium and oxygen nonstoichiometry, electrochemical behaiviour and transport properties", Solid State Ionics, vol. 170, pp. 159-171, Apr. 1, 2004, 13 pages.
ISA European Patent Office, Extended European Search Report of EP09713108, Mar. 4, 2013, Germany, 11 pages.
Ra, D. et al., "Used Lithium Ion Rechargeable Battery Recycling using Etoile-Rebatt Technology", Journal of Power Sources, vol. 163, pp. 284-288, Jul. 24, 2006, 5 pages.
Han et al., "Fabrication in a Single Synthetic Step of Electrochemically Active LiMO2 (M=Ni and Co) Thin-Film Electrodes Using Soft Solution Processing at 20-200° C." Chemistry of materials vol. 10, Issue 8; Jul. 25, 1998; pp. 2183-2188.
Han et al., "Room-Temperature Fabrication of Lithium Cobalt Oxide Thin-Film Electrodes by Lithium Hydroxide Solution Treatment." Journal of the American Ceramic Society; vol. 81, Issue 9; Sep. 1998, pp. 2465-2468.
Han et al., "Soft solution processing for fabrication of lithiated thin-film electrodes in a single synthetic step." Journal of Material Chemistry; vol. 8, Issue 9; Aug. 1998; pp. 2043-2048.
Kosova et al., "Mixed layered Ni—Mn—Co hydroxides: Crystal structure, electronic state of ions, and thermal decomposition." Journal of Power Sources; vol. 174, Issue 2; Dec. 6, 2007; pp. 735-740.
Li et al. "Synthesis and characterization of LiNi0.6Mn0.4-xCoxO2 as cathode materials for Li-ion batteries" Journal of Power Sources; vol. 189, Issue 1; Apr. 1, 2009; pp. 28-33.
Manthiram et al., "Low temperature synthesis of insertion oxides for lithium batteries." Chemistry of materials; vol. 10 Issue 10; Sep. 18, 1998; pp. 2895-2909.
Shaju et al., "Performance of layered Li(Ni1/3Co1/3Mn1/3)O2 as cathode for Li-ion batteries" Electrochimica Acta; vol. 48, Issue 2; Nov. 2002; pp. 145-151.
Shin et al. "Continuous hydrothermal synthesis of HT-LiCoO2 in supercritical water" The Journal of Supercritical Fluids; vol. 50, Issue 3; Oct. 2009; pp. 250-256.
Watanabe et al. "Direct fabrication of crystalline vanadates films by hydrothermal-electrochemical method." Solid State Sciences; vol. 3, Issue 1; Feb. 2001; pp. 183-188.

* cited by examiner

*Primary Examiner* — Ladan Mohaddes
(74) *Attorney, Agent, or Firm* — Alleman Hall McCoy Russell & Tuttle LLP

(57) ABSTRACT

Methods for making a recycled or refurbished electrode material for an energy-storage device are provided. One example method comprises harvesting a lithium-deficient electrode material from a recycling or waste stream, and replenishing at least some lithium in the lithium-deficient electrode material. A second example method comprises breeching an enclosure of a cell of an energy storage device, replenishing at least some lithium in a lithium-deficient electrode material of the cell, and sealing the enclosure of the cell.

14 Claims, 6 Drawing Sheets

REINTRODUCTION OF LITHIUM INTO RECYCLED BATTERY MATERIALS

CROSS REFERENCE TO RELATED APPLICATION

This application claims priority from U.S. Provisional Application 61/030,916, filed on 22 Feb. 2008 and entitled REINTRODUCTION OF LITHIUM INTO RECYCLED BATTERY MATERIALS, the entirety of which is hereby incorporated herein by reference for all purposes.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of innovation research award #0750552 awarded by the National Science Foundation.

TECHNICAL FIELD

The present application relates to the field of lithium-based energy-storage devices, and more particularly, to recycling lithium-based energy-storage devices.

BACKGROUND

Lithium-based energy-storage devices are used in a variety of consumer products. Such devices include supercapacitors, ultracapacitors, and more commonly lithium cells and lithium-ion cells. These devices are often referred to as 'lithium batteries' both individually and as an ensemble. Some lithium-based energy-storage devices are rechargeable and have a relatively long useful lifetime. Nevertheless, they eventually fail or are discarded prior to failure, and therefore contribute to a significant and growing waste stream. In view of this situation, environmental regulations, industry standards, and collection services have arisen to promote the recycling of lithium-based energy storage devices.

SUMMARY

The inventors herein have recognized that an economically robust recycling or refurbishing strategy is one that preserves and enhances the value of the electrode material. Therefore, in one embodiment, a method for making a recycled electrode material for an energy-storage device is provided. The method comprises harvesting a lithium-deficient electrode material from a recycling or waste stream, and replenishing at least some lithium in the lithium-deficient electrode material.

In another embodiment, a method for refurbishing an electrode material in a cell of an energy-storage device is provided. The method comprises breeching an enclosure of the cell, replenishing at least some lithium in a lithium-deficient electrode material of the cell, and sealing the enclosure of the cell.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

Figure 1:
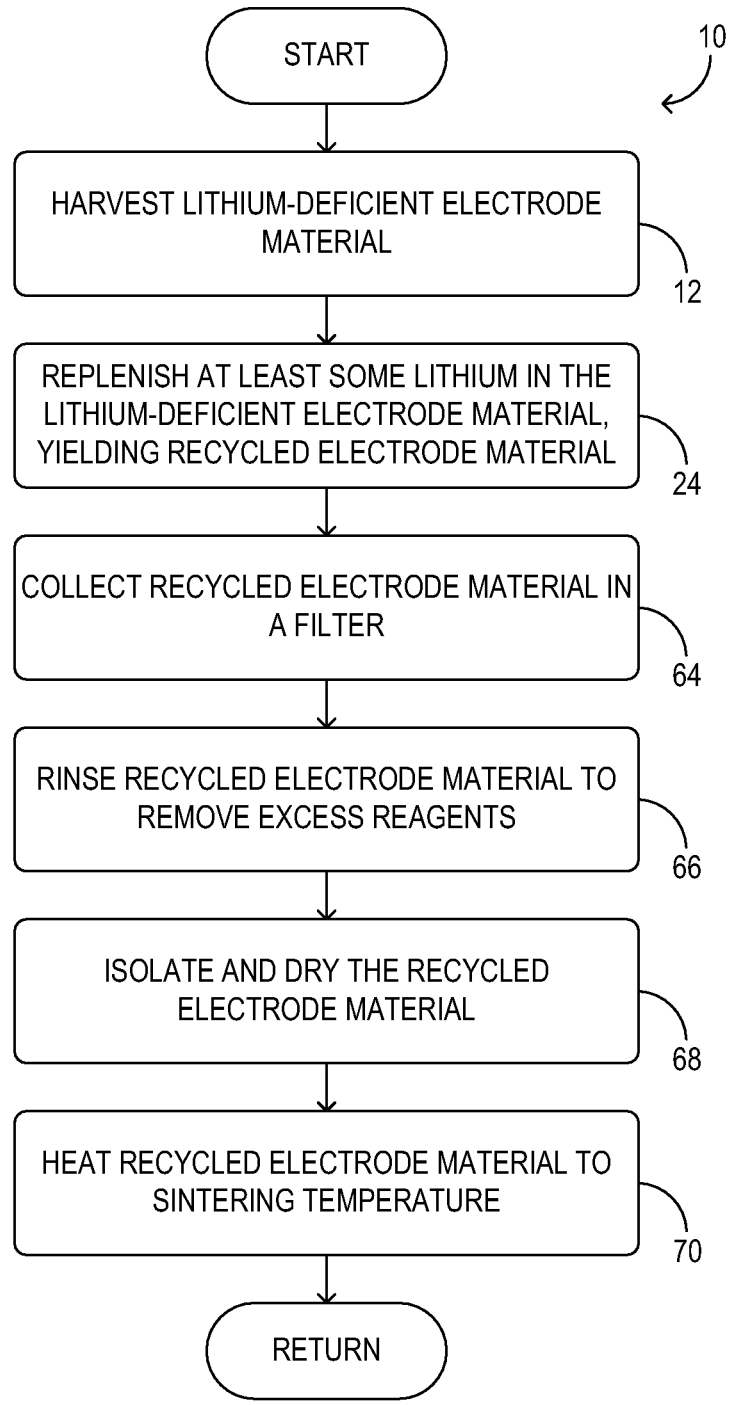
FIG. 1 illustrates aspects of an example method for making a recycled electrode material for an energy-storage device, in accordance with the present disclosure.

FIG. 1 illustrates aspects of an example embodiment of a method 10 for making a recycled electrode material for an energy-storage device. It will be understood that the example method may be part of a more extensive method for recycling batteries and/or processing waste streams that include battery-derived wastes. Further, the example method may be part of a more extensive method for making a recycled electrode for an energy-storage device or for making an energy storage device. Accordingly, in some embodiments, one or more actions may be taken prior to the first illustrated step, and one or more actions may follow the final illustrated step.

At 12, a lithium-deficient electrode material is harvested from a recycling or waste stream. The recycling or waste stream from which the lithium-deficient electrode material is harvested may be a dedicated battery recycling or waste stream, or more particularly, a lithium-battery recycling or waste stream. Further, the lithium-deficient electrode material may be harvested from the waste or recycling stream in any suitable manner. However, one example harvesting method is illustrated in FIG. 2.

Figure 2:
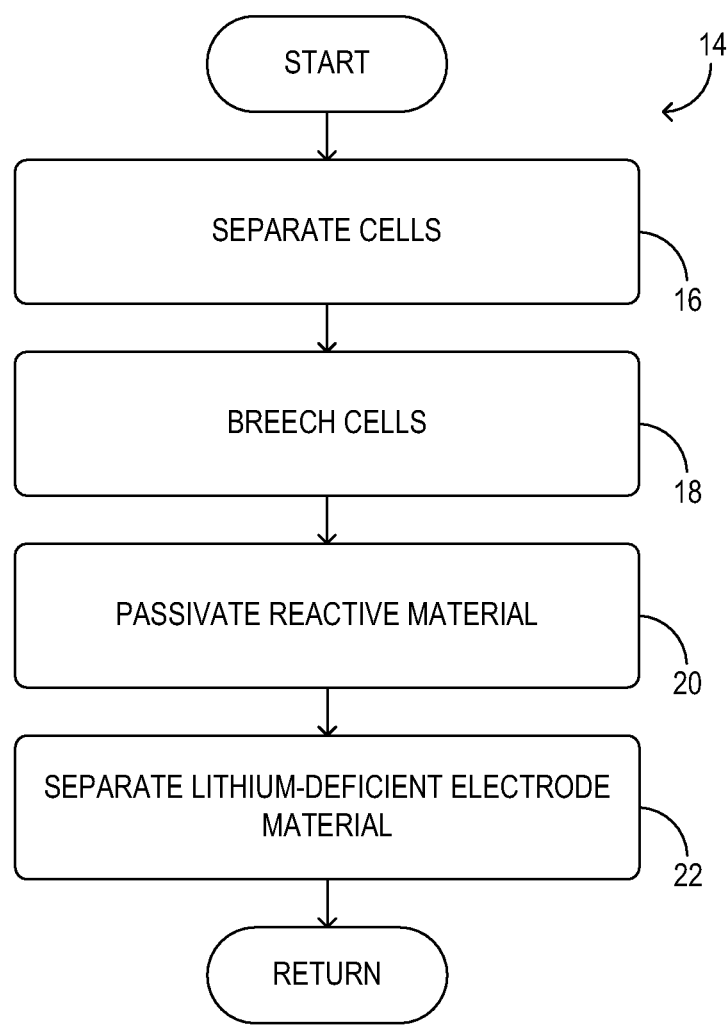
FIG. 2 illustrates an example method for harvesting a lithium-deficient electrode material from a waste or recycling stream, in accordance with the present disclosure.

Referring now to FIG. 2, harvesting method 14 begins at 16, where the cells of a spent battery (if the battery comprises more than one cell) are separated. Separating the cells of the spent battery may comprise removing or opening an envelope of the battery, for example. The harvesting method then advances to 18, where the enclosures of the one or more cells of the battery are breeched. Breeching the enclosures may involve drilling or cutting the enclosures, for example. These actions may be most appropriately applied to cells not particularly designed to facilitate recycling. For cells that are designed to facilitate recycling, breeching the enclosures may involve puncturing or otherwise opening a dedicated breech passage. In these and other embodiments, the enclosures of the cells may be breeched in a controlled environment—in a reduced humidity or reduced dioxygen-content environment for example. In one, non-limiting embodiment, the enclosures of the cells may be breeched under a dinitrogen atmosphere. Breeching the enclosures in such controlled environments may reduce the risk of fire associated with exposure of a lithium-containing negative electrode of a cell to water vapor and/or dioxygen, as discussed below.

The harvesting method then advances to 20, where reactive material within the one or more cells of the battery is passivated. The term 'passivate' is used herein to indicate reducing the chemical reactivity of a substance to make it safer to store and/or handle. A form of chemical reactivity that is contemplated in the context of lithium batteries is the combustibility of the negative electrodes of lithium and lithium-ion cells. Such negative electrodes may contain lithium metal or lithium-intercalated graphite, which react violently with water and may spontaneously ignite in air. These materials may be passivated by controlled chemical oxidation and/or interaction with a Lewis base, such as an alkyl carbonate or ether, or a Lewis Acid such as $PF_5$. It is noted that this manner of passivation may be applied to other battery materials as well, in addition to lithium and lithium-ion battery materials. In one embodiment, passivating the reactive material may comprise exposing the one or more breeched cells to air and/or water in a controlled manner. In another embodiment, passivating the reactive material may comprise bathing the one or more breeched cells in a solvent such as liquid carbon dioxide or supercritical carbon dioxide, with a controlled amount of an oxidant such as air or water added to the carbon dioxide. In these and other embodiments, the controlled environment in which the breeched cells are passivated may be configured to accommodate a release of dihydrogen or other gas-phase products that may be released when the lithium-containing negative electrodes of the one or more breeched cells are passivated.

The harvesting method then advances to 22, where a lithium-deficient electrode material is separated from the one or more breeched cells of the battery. In one embodiment, the lithium-deficient electrode material separated from the one or more breeched cells may comprise a lithium-deficient form of lithium cobalt oxide ($LiCoO_2$), viz., $Li_{1-x}CoO_2$ where $0<x<1$. Thus, the lithium-deficient electrode material may be a positive electrode material used in a lithium or lithium-ion cell of the battery. Accordingly, the lithium-deficient electrode material may further comprise various other materials, including graphitic and/or amorphous carbon. In these and other embodiments, the lithium-deficient electrode material may comprise lithium-deficient forms of other positive electrode materials used lithium and lithium-ion cells: $LiTiO_2$, $LiFePO_4$, $LiMnO_2$, $LiNi_{0.80}Co_{0.05}Al_{0.15}O_2$, as examples.

In one embodiment, an intact positive electrode may be separated from a breeched cell. In other embodiments, positive electrode material may be removed in pieces or in a finely divided state—e.g., as particles. Further, in embodiments where pieces or particles are separated from a breeched cell, the lithium-deficient electrode material may be selected from a material stream based on a grain size, a particle size, or a structure size of the lithium-deficient electrode material. To this end, sieving may be applied to a material stream consisting of solids. Likewise, filtration or centrifugation may be applied to a material stream consisting of a liquid having suspended or entrained pieces or particles. In some embodiments, separating the lithium-deficient electrode material from the one or more breeched cells may further comprise rinsing the lithium-deficient electrode material with a solvent—e.g., water or carbon dioxide—and allowing the lithium-deficient electrode material to dry. This action may be taken in order to free the lithium-deficient electrode material from adherent liquid electrolyte. In other embodiments, the rinsing and/or drying steps may be enacted prior to separating the lithium-deficient electrode material from the one or more breeched cells. It will be understood that one or more process steps within harvesting method 14 may be wholly or partly automated. Further, the harvesting method may be repeated for any desired number of spent batteries in the waste or recycling stream.

Returning now to FIG. 1, at 24, at least some lithium is replenished in the lithium-deficient electrode material. The lithium may be replenished in any suitable manner, of which three series of replenishing embodiments are presented hereinafter by way of example.

Figure 3:
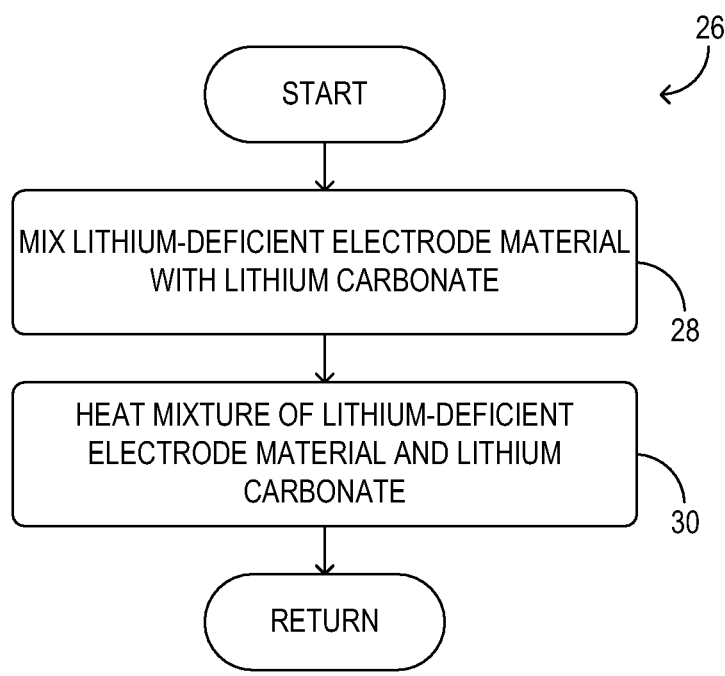
FIG. 3 illustrates an example embodiment of a solid-state method for replenishing at least some lithium in a lithium-deficient electrode material, in accordance with the present disclosure.

A first series of replenishing embodiments comprises promoting a solid-state reaction of the lithium-deficient electrode material with a lithium compound intimately present in excess. An embodiment of an example solid-state replenishing method 26 is illustrated in FIG. 3. The method begins at 28, where the lithium-deficient electrode material is intimately mixed with lithium carbonate ($Li_2CO_3$). The compounds may be mixed together in any suitable mill—e.g., a ball mill.

Method 26 then advances to 30, where the intimate mixture of the lithium-deficient electrode material and lithium carbonate is heated. The mixture may be heated in a convection furnace or tube furnace, for example. In some embodiments, the mixture may be heated under a reduced dioxygen-content atmosphere or other controlled atmosphere. In one embodiment, the intimate mixture may be heated to a sintering temperature of one or more components of the intimate mixture, for example, and held there for a predetermined period of time. Such sintering temperature may be in a range of 500-700° C., for example. In other embodiments, a temperature ramp or other program may be used to access sintering temperatures. Heating the intimate mixture to a sintering temperature under appropriate conditions may allow lithium from the lithium carbonate to diffuse into the lattice or lattices of the lithium-deficient electrode material. This action may result in the formation of a substantially fully lithiated and substantially crystalline material for renewed use in energy-storage devices.

In other embodiments, different lithium compounds may be used in place of or in addition to lithium carbonate—$Li_2SO_4$, $LiHCO_3$, $LiOH$, $LiI$, $LiF$, $LiCl$, $LiCH_3COO$, and/or $Li_2O$, for example. In still other embodiments, the intimate mixture of the lithium-deficient electrode material and the lithium compound may be heated to a temperature greater than or less than the sintering temperature of any of the components of the intimate mixture. For example, the mixture may be heated to the range of 700-2500° C. for 1 to 10 days, for example. It will be understood that the temperature and reaction-time ranges given here are exemplary and will depend on the compound or compounds present in the lithium-deficient electrode material and on the lithium compounds selected.

Figure 4:
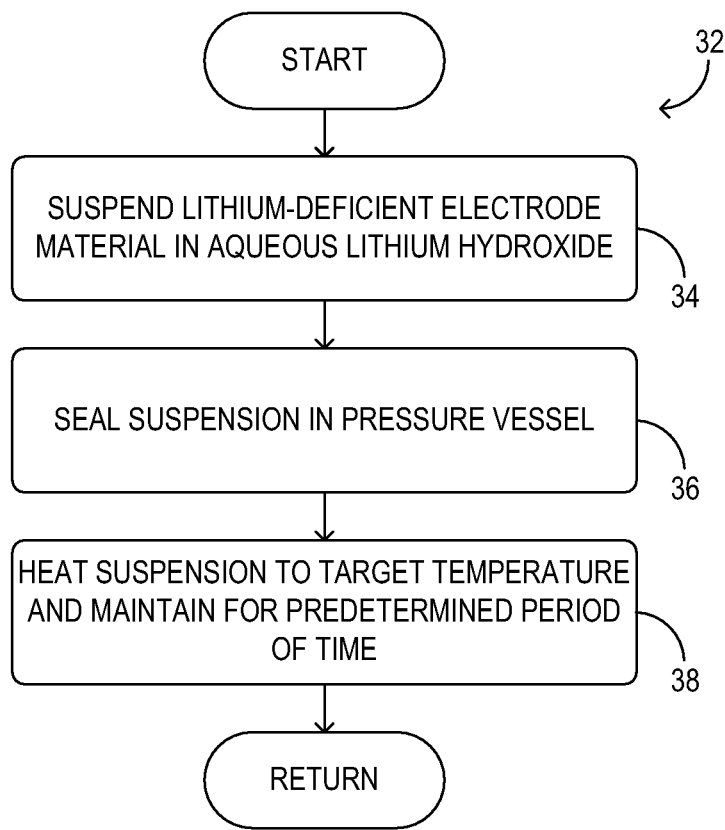
FIG. 4 illustrates an example embodiment of a hydrothermal method for replenishing at least some lithium in a lithium-deficient electrode material, in accordance with the present disclosure.

A second series of replenishing embodiments comprises promoting a hydrothermal reaction of the lithium-deficient electrode material with a lithium-ion containing solution. An example embodiment of a hydrothermal replenishing method 32 is illustrated in FIG. 4. The method begins at 34, where the lithium-deficient electrode material is suspended in an aqueous lithium hydroxide solution. The method advances to 36, where the resulting suspension is sealed in a pressure vessel, and to 38, where the suspension sealed in the pressure vessel is heated under pressure to an appropriate target temperature and maintained at that temperature for a predetermined period of time. Optimal target temperatures and reaction times may vary from batch to batch of the lithium-deficient electrode material, and may be determined empirically by subjecting the processed material to appropriate analysis. For example, conventional elemental analysis may be used to assay the lithium content, and x-ray powder diffraction may be used to evaluate the crystalline structure of the processed material. Based partly on these data, reaction temperatures and reaction times may be chosen to provide a suitable product at a reasonable processing cost. Thus, hydrothermal processing may provide an attractive, lower-temperature route to promoting lithium diffusion into the lattice or lattices of the lithium-deficient electrode material. This action may result in the formation of a substantially fully lithiated and substantially crystalline material for renewed use in energy-storage devices.

As noted above, hydrothermal replenishing method 32 may be performed under various suitable conditions depending on the initial state of the lithium-deficient electrode material—its composition, degree of lithium deficiency, etc. In one example, however, a suspension of $LiCoO_2$-based electrode material may be heated to 100-300° C. in approximately 4 molar lithium hydroxide for a period of 12-48 hours. Some experiments have suggested that concentrations of lithium hydroxide less than 2 molar may be less effective for hydrothermally replenishing the lithium in some lithium-deficient electrode materials. A typical batch size may be approximately 50 kilograms, which at a tap density of 2.5 grams per cubic centimeter, may be accomplished in a volume of approximately 20 liters. Accordingly, the reaction may be conducted a suitably designed stainless steel pressure vessel of larger capacity. In some embodiments, other solvents besides water may be used in the suspension—tetrahydrofuran, acetonitrile, and hexane, as examples. When these solvents are present in the suspension, lower reaction temperatures may be used.

A third series of replenishing embodiments comprises reducing the lithium-deficient electrode material in an environment comprising lithium ions. As used herein, the terms 'reducing,' 'reduction,' etc., will be understood to include any meanings ascribed to them in the field of redox chemistry. As such, they embrace such variants as chemical reduction, electrochemical reduction, and photoelectrochemical reduction. Further, 'reducing . . . in an environment comprising lithium ions' will be understood to include all formal equivalents of the same, such as reacting with a lithium atom donor, i.e., 'lithiating.'

Figure 5:
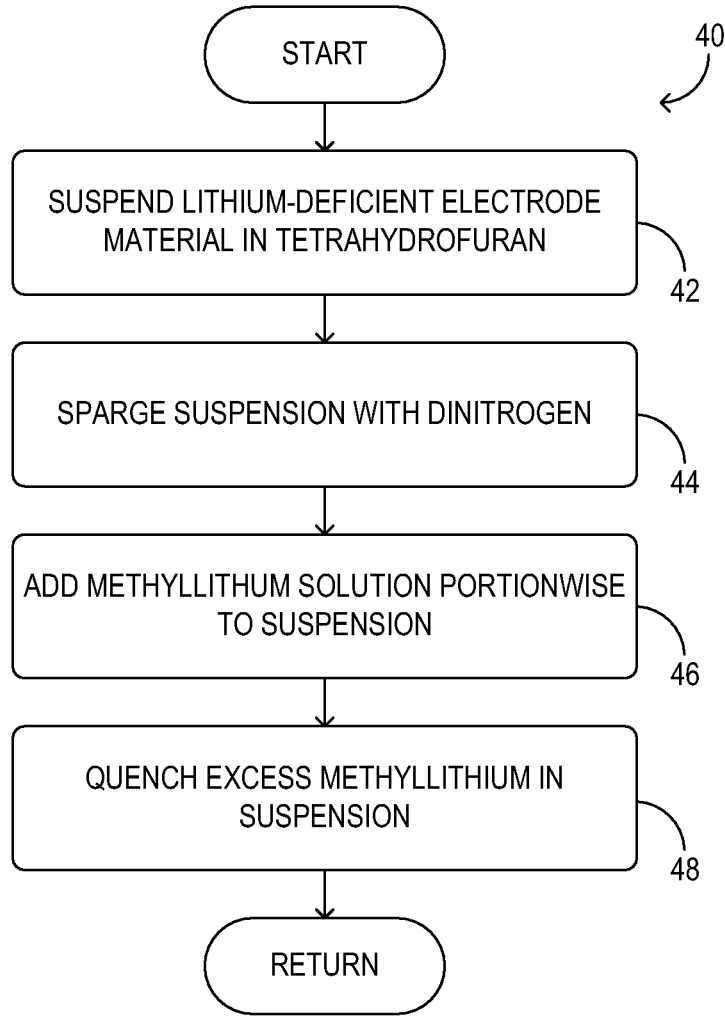
FIG. 5 illustrates an example embodiment of a reductive method for replenishing at least some lithium in a lithium-deficient electrode material, in accordance with the present disclosure.

Accordingly, some embodiments comprise allowing the lithium-deficient electrode material to react with one or more organolithium compounds, which may include alkyllithium and/or aryllithium compounds. Representative, non-limiting examples include n-butyllithium, sec-butyllithium, methyllithium, lithium napthalide, etc. To facilitate reaction with the lithium-deficient electrode material in the suspended state, the organolithium compound may be dissolved in any suitable solvent system—ethers, hydrocarbons, and mixtures thereof—to which the lithium-deficient electrode material is introduced, for example, as a slurry. An example embodiment of a reductive replenishing method 40 is illustrated in FIG. 5. The method begins at 42, where the lithium-deficient electrode material is suspended in an ether solvent such as tetrahydrofuran. Vigorous stirring may be used to keep the lithium-deficient electrode material in suspension. The method then advances to 44, where the suspension is sparged with a stream of dinitrogen to remove dissolved dioxygen and/or carbon dioxide. In another embodiment, the suspension may be stirred vigorously under an atmosphere of dinitrogen. The method then advances to 46, where a solution of 0.25 molar methyllithium dissolved in tetrahydrofuran is added to the suspension at controlled rate while vigorous stirring is maintained. In one embodiment, the methyllithium solution may be added portionwise. The rate of addition of the methyllithium solution may be responsive to such factors as the initial amount of lithium-deficient electrode material to be reacted, the degree of lithium deficiency of the material, and the temperature of the suspension. For example, a predetermined temperature range for the suspension may be 0-35° C., and the rate of addition of the methyllithium solution may be controlled so that the temperature does not exceed the upper limit of the temperature range. It will be understood that the temperature range given here is exemplary, and that other suitable temperature ranges and reaction conditions may be used instead. Further, the methyllithium solution may be added until a predetermined degree of re-lithiation of the lithium-deficient electrode material is achieved—e.g., 90% of stoichiometric, 95% of stoichiometric, etc. In one embodiment, the degree of re-lithiation may be determined by withdrawing an aliquot of the suspension from the reaction vessel and assaying the lithium content of the solid in the aliquot. In another embodiment, the degree of re-lithiation may be estimated or inferred based on the concentration of unreacted methyllithium remaining in the suspension some time after a portion of methyllithium solution is added to the suspension. The concentration of unreacted methyllithium remaining in the suspension may be determined or estimated via any suitable analytical procedure.

The method then advances to 48, where excess methyllithium in the suspension is quenched. The excess methyllithium may be quenched by addition of a suitable Lewis acid—e.g., carbon dioxide or an alcohol—to the suspension while vigorous stirring is maintained.

Other reducing agents besides organolithium compounds may also be used. These include lithium iodide, lithium dithionite, lithium thiosulfate, and lithium sulfide, as examples.

In one embodiment, a lithium-deficient $LiFePO_4$-based electrode material may be suspended in a solvent system comprising ethylene carbonate and diethyl carbonate, and lithium iodide added to the suspension. The mixture is stirred vigorously for a period of 8-24 hours at ambient temperatures, or heated at reflux, after which treatment the processed electrode material is collected by filtration.

In still other embodiments, non-lithium based reducing agents such as iron filings, hydrazine or hydrazine-based compounds may be used in conjunction with a non-reducing source of lithium ions: lithium hydroxide or lithium acetate, as examples. Such combinations of reagents may be used to effectively replenish at least some lithium in the lithium deficient electrode material.

Reducing agents such as these may be dissolved and/or suspended in various solvent systems, and the lithium-deficient electrode material suspended in the resulting mixtures to effect reduction. Thus, to replenish at least some of the lithium in a lithium-deficient electrode material, the material may be suspended in a solution comprising one or more of a lithiating agent, a reducing agent, and lithium ions. Further, suspending the lithium-deficient electrode material in the solution may comprise suspending it in a solution comprising one or more of liquid and supercritical carbon dioxide.

Methods as illustrated above may even be applied to lithium-deficient electrode material still present within a lithium or lithium ion cell. Thus, the approach set forth herein may be applied to various battery-refurbishing, as well as battery-recycling, strategies. One example embodiment is illustrated in FIG. 6.

Figure 6:
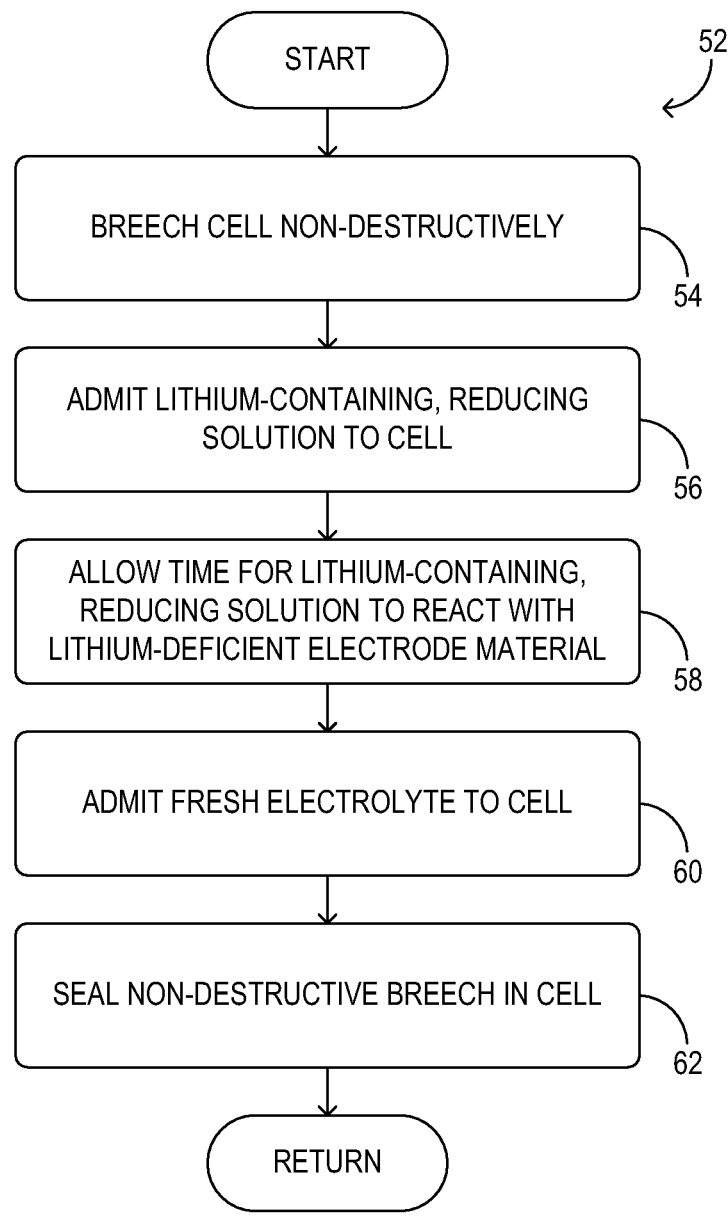
FIG. 6 illustrates an example embodiment of a lithium or lithium-ion cell refurbishment method, in accordance with the present disclosure.

FIG. 6 illustrates an example lithium or lithium-ion cell refurbishment method 52. In some embodiments, the method may be enacted in a reduced-dioxygen content atmosphere, as noted above. The method begins at 54, where an enclosure of the cell is non-destructively breeched. The enclosure may be non-destructively breeched by making a small hole in the enclosure, or, for cells particularly designed for refurbishing, by opening one or more valves disposed between the ambient and the electrolyte of the cell. The method then advances to 56, where a lithium-ion containing, reducing solution is admitted through the breech in the cell. In one example, a solution of lithium iodide in ethylene carbonate and/or diethyl carbonate may be admitted through the breech in the cell. In another example, a solvent system for the lithium-ion containing, reducing solution may include liquid or supercritical carbon dioxide. Accordingly, the method may, in one, non-limiting embodiment, be part of a more extensive battery refurbishment process that includes extraction of the electrolyte using supercritical carbon dioxide.

Continuing in FIG. 6, method 52 then advances to 58, where the cell is allowed time for the lithium-ion containing, reducing solution to react with the lithium-deficient electrode material within the cell. In some examples, the cell may shaken or rocked to increase the rate of the lithium-replenishing reaction. In these and other embodiments, the cell may be incubated at greater-than-ambient temperatures to increase the rate of reaction. The method then advances to 60, where fresh electrolyte solution is admitted to the cell through the breech. In some examples, this step of the process may further comprise forcing out some or all of the lithium-ion containing, reducing solution which was admitted to the cell at 56, by utilization of supercritical carbon dioxide, or centrifugation, for example. The method then advances to 62, where the breech in the cell is sealed. Sealing the breech in the cell may comprise closing one or more of the valves referred to above, or, in cells not particularly designed for refurbishing, by applying a sealant or adhesive to the breech.

In other embodiments, the lithium-deficient electrode material may be reduced electrochemically in a solution comprising lithium ions. This approach may be most easily accomplished using a positive electrode of a spent battery which is separated intact from a breeched cell of the battery. In other embodiments, however, the lithium-deficient electrode material may be deposited on a tray or grid electrode, in pieces or in a finely divided state, and the tray or grid electrode biased at a reducing potential within an electrochemical cell. Example electrolytes for the electrochemical reduction include aqueous, one-molar lithium hydroxide, but other lithium-ion containing electrolytes may be used instead.

In still other embodiments, the lithium-deficient electrode material may be photolyzed in an environment comprising lithium ions. In one example, the lithium-deficient electrode material may be intimately mixed with lithium iodide and subject to ultraviolet (UV) irradiation. The mixture may be irradiated in the solid state or in a slurry. In one embodiment, the slurry may be flowed through an intense UV irradiance for efficient and consistent irradiation. In another embodiment, an auger may be used to conduct the mixture in solid form through the UV irradiance.

Continuing in FIG. 1, method 10 advances to 64, where the formerly lithium-deficient electrode material (now referred to as a recycled electrode material) is collected in a filter, and to 66, where it is rinsed with a solvent to remove one or more excess reagents which may have adhered to the material in the course of one or more replenishing procedures. Method 10 then advances to 68, where the recycled electrode material is isolated by filtration. In other embodiments, centrifugation may be used to isolate the recycled material, instead of or in addition to filtration. In these and other embodiments, the isolation step may further comprise drying the recycled electrode material is dried in air—by drawing air through the filter, for example. Following isolation of the recycled electrode material, method 10 advances to 70, where the isolated recycled electrode material is heated to a sintering temperature. Sintering may be done to increase the crystallinity of the recycled electrode material, as noted above. It is further noted that, depending on which of the various contemplated replenishing embodiments is enacted at 24, sintering at 70 may constitute a first or subsequent sintering process in method 10. Moreover, additional embodiments contemplated and fully embraced by this disclosure may comprise a sintering process prior to replenishing at 24. Naturally, it will be understood that one or more process steps within method 10 may be wholly or partly automated, and that the method may be repeated for any desired number of spent batteries in the waste or recycling stream.

It will be further understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method for making recycled positive-electrode material for a lithium-ion energy-storage device, the method comprising:

harvesting lithium-deficient positive-electrode material from a recycling or waste stream;

placing the lithium-deficient positive-electrode material in a pressure vessel containing an aqueous solution comprising lithium ions;

processing the lithium-deficient positive-electrode material in the pressure vessel to replenish at least some lithium in the lithium-deficient positive-electrode material by diffusing lithium into a lattice of the lithium-deficient positive-electrode material, wherein processing the lithium-deficient positive-electrode material comprises suspending the lithium-deficient positive-electrode material in the aqueous solution comprising lithium ions and hydrothermally reacting the lithium-deficient positive-electrode material with the aqueous solution comprising lithium ions in the pressure vessel at elevated temperature and pressure to form a hydrothermally reacted positive-electrode material, the elevated temperature being in a range of 100-300 degrees Celsius;

after forming the hydrothermally reacted positive-electrode material, removing the hydrothermally reacted positive-electrode material from the aqueous solution comprising lithium ions and then sintering the hydrothermally reacted positive-electrode material to form the recycled positive-electrode material.

2. The method of claim 1, wherein harvesting the lithium-deficient positive-electrode material comprises separating an intact electrode from a spent battery.

3. The method of claim 1, wherein harvesting the lithium-deficient positive-electrode material comprises separating the lithium-deficient positive-electrode material from a spent battery in pieces or in a finely divided state.

4. The method of claim 1, wherein harvesting the lithium-deficient positive-electrode material comprises selecting the lithium-deficient positive-electrode material based on a grain size, a particle size, or a structure size of the lithium-deficient positive-electrode material.

5. The method of claim 1, wherein the lithium-deficient positive-electrode material comprises lithium-deficient lithium cobalt oxide and a lithium-deficient form of one or more of lithium titanium oxide, lithium iron phosphate, lithium manganese oxide, and lithium nickel cobalt aluminum oxide, and wherein diffusing lithium into the lattice of the lithium-deficient positive-electrode material to form the recycled positive-electrode material comprises diffusing lithium into a lattice of each lithium-deficient material in the lithium-deficient positive-electrode material.

6. The method of claim 1, wherein replenishing at least some lithium comprises photolyzing the lithium-deficient positive-electrode material in an environment comprising lithium ions.

7. The method of claim 1, wherein replenishing at least some lithium comprises suspending the lithium-deficient positive-electrode material in a solution comprising one or more of a lithiating agent, a reducing agent, and lithium ions.

8. The method of claim 7, wherein suspending the lithium-deficient positive-electrode material in a solution comprises suspending the lithium-deficient positive-electrode material in a solution comprising one or more of an ether and a hydrocarbon.

9. The method of claim 7, wherein suspending the lithium-deficient positive-electrode material in a solution comprises suspending the lithium-deficient positive-electrode material in a solution comprising one or more of liquid and supercritical carbon dioxide.

10. The method of claim 1, wherein replenishing at least some lithium comprises promoting a solid state reaction of the lithium-deficient positive-electrode material with a lithium compound intimately present in excess.

11. The method of claim 10, wherein promoting the solid state reaction comprises heating an intimate mixture of the lithium-deficient positive-electrode material and the lithium compound to a sintering temperature of one or more components of the intimate mixture.

12. The method of claim 1, wherein replenishing the lithium-deficient positive-electrode material yields a recycled electrode material, the method further comprising rinsing the recycled electrode material in a solvent to remove an excess reagent.

13. The method of claim 1, wherein sintering the hydrothermally reacted positive-electrode material comprises heating the recycled hydrothermally reacted positive-electrode material to a sintering temperature of 500-800 degrees Celsius.

14. The method of claim 1, wherein sintering the hydrothermally reacted positive-electrode material comprises heating a recycled hydrothermally reacted positive-electrode material to a sintering temperature without addition of lithium.

* * * * *